United States Patent
Shiomi et al.

(10) Patent No.: US 6,791,615 B1
(45) Date of Patent: Sep. 14, 2004

(54) IMAGE PICKUP APPARATUS

(75) Inventors: Yasuhiko Shiomi, Tokyo (JP); Yusuke Shirakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/515,667

(22) Filed: Feb. 29, 2000

(30) Foreign Application Priority Data

Mar. 1, 1999 (JP) ............................................ 11-053382
Sep. 20, 1999 (JP) ............................................ 11-265379

(51) Int. Cl.$^7$ ......................... H04N 5/335; H04N 1/387
(52) U.S. Cl. ..................... 348/323; 348/311; 348/218.1; 358/450
(58) Field of Search ................................ 348/323, 316, 348/36, 311, 321, 320, 218.1, 312, 219.1, 38; 358/540, 450, 483

(56) References Cited

U.S. PATENT DOCUMENTS

| | | | | |
|---|---|---|---|---|
| 5,523,788 A | * | 6/1996 | Kannegundla et al. | 348/321 |
| 5,737,015 A | | 4/1998 | Juen | |
| 5,889,553 A | * | 3/1999 | Kino et al. | 348/218.1 |
| 5,896,172 A | * | 4/1999 | Korthout et al. | 348/248 |
| 5,907,353 A | * | 5/1999 | Okauchi | 348/218.1 |
| 5,917,546 A | * | 6/1999 | Fukui | 348/296 |
| 6,100,928 A | * | 8/2000 | Hata | 348/229.1 |
| 6,278,480 B1 | * | 8/2001 | Kurahashi et al. | 348/59 |
| 6,337,713 B1 | * | 1/2002 | Sato | 348/311 |
| 6,466,262 B1 | * | 10/2002 | Miyatake et al. | 382/284 |
| 6,639,625 B1 | * | 10/2003 | Ishida et al. | 348/218.1 |

FOREIGN PATENT DOCUMENTS

| | | |
|---|---|---|
| JP | 2-78382 | 3/1990 |
| JP | 5-167848 | 7/1993 |
| JP | 7-38812 A | 2/1995 |
| JP | 7-283976 | 10/1995 |
| JP | 8-125934 | 5/1996 |
| JP | 9-46599 | 2/1997 |
| JP | 10-276976 | 10/1998 |
| JP | 10-336529 | 12/1998 |
| JP | 2001-94886 | 4/2001 |

* cited by examiner

*Primary Examiner*—Wendy R. Garber
*Assistant Examiner*—Lin Ye
(74) *Attorney, Agent, or Firm*—Fitzpatrick, Cella, Harper & Scinto

(57) ABSTRACT

An image pickup apparatus comprises an image pickup area which includes first and second areas each of which converts an object image into an electric signal, a first output terminal for outputting the electric signal from the first area, and a second output terminal for outputting the electric signal from the second area. A correction circuit corrects at least one of the electric signal output from the first output terminal and the electric signal output from the second output terminal, on the basis of a correlative relationship between the electric signal output from a portion of the first area through the first output terminal and the electric signal output from a portion of the second area through the second output terminal. A timing generation circuit drives a plurality of pixels arranged in a predetermined direction across the boundary between the first and second areas so that a read-out order of signals from pixels included in the first area among the plurality of pixels and a read-out order of signals from pixels included in the second area among the plurality of pixels are in reverse order, wherein a side on a side opposite to the boundary side of the portion of the first area is on the boundary side with respect to the center of the first area, and a side on a side opposite to the boundary side of the portion of the second area is on the boundary side with respect to the center of the second area.

14 Claims, 12 Drawing Sheets

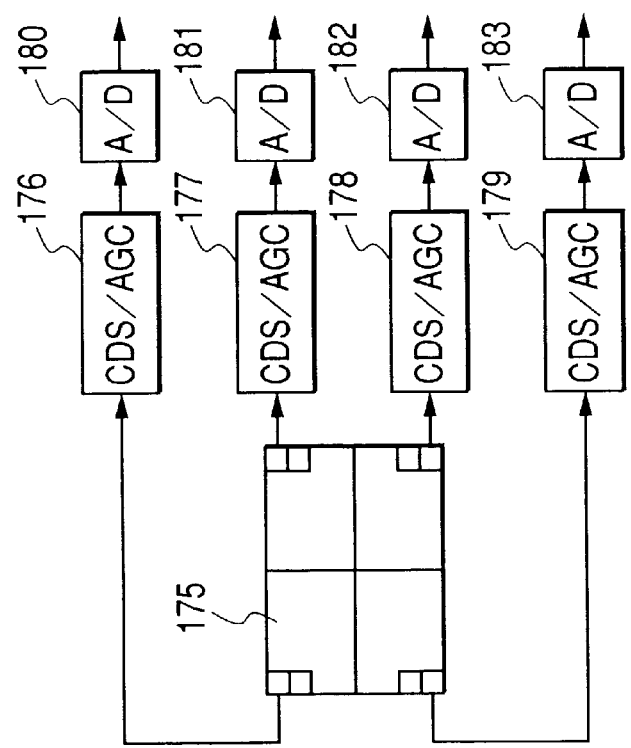
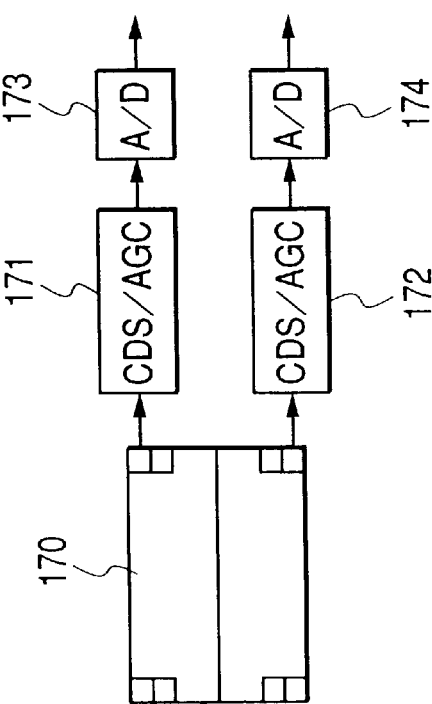
FIG. 12B
FIG. 12A

IMAGE PICKUP APPARATUS

BACKGROUND OF THE INVENTION

1. Field of the Invention

The present invention relates to an image pickup apparatus used in a digital camera or the like, and is structured to have plural image pickup areas used to pick up an image of a object by dividing the image into plural areas and plural output portions provided to correspond to the respective image pickup areas. Particularly, the present invention relates to a method which automatically discriminates output levels among plural outputs and corrects the output levels so as to eliminate unbalance in the plural outputs.

2. Related Background Art

Conventionally, a digital still camera having such a structure as shown in FIG. 1 has been known. In the case of the structure shown in FIG. 1, a system control CPU 100 detects a state change of a camera operation switch 101 (composed of a main switch and a release switch of a camera) caused by a photographer himself, and starts power supplying to other circuit blocks.

An image of an object within a photographing picture range is formed on an image pickup element 104 through main photographing optical systems 102 and 103, and an electrical signal from the image pickup element 104 is converted into a predetermined digital signal for each pixel in due order by an A/D conversion circuit 106 through a CDS/AGC circuit 105.

On the basis of a signal from a timing generator 108 which determines overall driving timing, the image pickup element 104 is driven by an output of a driver circuit 107 which horizontally and vertically drives each pixel, and thus the image pickup element 104 outputs an image signal.

Similarly, the CDS/AGC circuit 105, which performs analog processing to the output from the image pickup element 104, to convert its level into a predetermined signal level, and the A/D conversion circuit 106 operate on the basis of the timing from the timing generator 108.

An output from the A/D conversion circuit 106 is input to a memory controller 115 through a selector 109 which performs signal selection based on a signal from the system control CPU 100, and all signal outputs from the controller 115 are transferred to a frame memory 116. Therefore, since pixel data for each photographing frame is first stored in the frame memory 116 in this case, running (or successive) photographing or the like is performed as a writing operation to the frame memory 116.

After the photographing ends, the contents of the frame memory 116 which stores the photographed data are transferred to a camera DSP 110 through the selector 109 under the control of the memory controller 115. The camera DSP 110 generates R, G and B color signals on the basis of the pixel data of the photographed data stored in the frame memory 116.

Ordinarily, in the state before the photographing, this result is periodically (for each frame) transferred to a video memory 111, whereby finder display or the like is performed through a monitor display circuit 112.

On the other hand, when the photographer himself performs the photographing operation by operating the camera operation switch 101, the pixel data of one frame is read from the frame memory 116, objected to image processing by the camera DSP 110, and first stored in a work memory 113, in response to the control signal from the system control CPU 100.

Subsequently, the data in the work memory 113 is compressed based on a predetermined compression format by a compression and expansion circuit 114, and the compressed result is stored in an external nonvolatile memory 117 (ordinarily a nonvolatile memory such as a flash memory is used).

Conversely, when the photographer wishes to observe the picked-up image data after photographing, the data which was compressed and stored in the external nonvolatile memory 117 is expanded into ordinary data of each photographing pixel through the compression and expansion circuit 114, and the expanded result is transferred to the video memory 111, whereby the image data can be observed on the monitor display circuit 112.

As above, the ordinary digital camera is structured to convert the output from the image pickup element 104 into the actual image data through processing circuits substantially in real time, and output the converted result to the memory or the monitor circuit.

On the other hand, in order to improve the capability of running photographing and the like in such a digital camera system as described above (e.g., in order to obtain a capability close to 10 frames/second), systematic improvement including improvement of the image pickup element is necessary. For example, it is necessary to increase a reading speed from the image pickup element, increase a writing speed of the image pickup element data to the frame memory, or the like.

FIG. 2 simply shows, as one of improvement methods, a structure of a two-output type device composed of the image pickup element such as a CCD. In this device, the horizontal CCD is divided into two.

In the CCD of FIG. 2, charges of the respective pixels generated by a photodiode unit 90 are together transferred to the vertical CCD at predetermined timing, and the charge of the vertical CCD for each line is transferred to horizontal CCD's 92 and 93 at next timing.

Here, the horizontal CCD's 92 transfer the charges to a left-side amplifier 94 at each transfer clock pulse, and the horizontal CCD's 93 transfer the charges to a right-side amplifier 95 at each transfer clock pulse, whereby the photographed image data of this CCD is divided into right and left in two on the boundary of the center of the picture, and the divided image data is read.

Although the amplifiers 94 and 95 are ordinarily manufactured within the CCD device, these amplifiers are laid out at positions considerably separated from one another, whereby relative accuracy of the amplifier 94 does not necessarily match with that of the amplifier 95 completely. For this reason, the outputs of the left and right pictures from the amplification are separately sent to CDS/AGC circuits 96 and 98 and adjusted by external adjustment means 97 and 99, respectively, to match the left and right outputs to each other.

In an image pickup element capable of realizing such high-speed reading as described above, a method to simultaneously read the signals from the two or more outputs is applied. This technique is indispensable to bringing the digital camera in the future closer to a silver salt camera (a product having a specification of about 8 frames/second has already been achieved in a silver salt camera of the single lens reflex type).

Having plural outputs is advantageous with respect to the speed. However, from the viewpoint of matching the output levels, having plural outputs is obviously disadvantageous as compared with having only one output.

In the mere manual adjustment method, in which, e.g., the output levels are analog-adjusted in the conventional CDS/AGC circuit, or the output levels after A/D conversion are digital-adjusted by matching both channels, the value of, e.g., VR resistance itself changes due to an environmental change even if the levels have been considerably matched at the manufacturing stage, whereby the possibility to which temperature characteristics of the two CDS/AGC circuits completely match with each other is extremely low.

When such a reading method of the image pickup element as described above is performed, if the relative accuracy of both the left and right outputs exceeds ±1%, unbalance of the boundary on the picture is clearly recognized by a viewer.

SUMMARY OF THE INVENTION

An object of the present invention is to correct, in an image pickup apparatus which picks up an image of a object by dividing the image into plural image pickup areas, unbalance between image signals output from plural output portions provided for respective image pickup areas.

In order to achieve the above object, according to one aspect of the present invention, there is provided an image pickup apparatus comprising:

image pickup areas for picking up an image of a object by dividing the image into plural areas;

plural output portions, each provided for a respective one of the image pickup areas, for outputting image signals respectively from the image pickup areas;

calculation means for calculating correlation among the plural image signals respectively output from the plural output portions; and correction means for performing correction processing on the plural image signals output from the plural output portions, on the basis of the signal output from the calculation means.

Other objects and features of the present invention will become apparent from the following detailed description and the attached drawings.

BRIEF DESCRIPTION OF THE DRAWINGS

FIGS. 12A and 12B are block diagrams showing the sixth embodiment of the present invention.

DETAILED DESCRIPTION OF THE PREFERRED EMBODIMENTS

Figure 1:
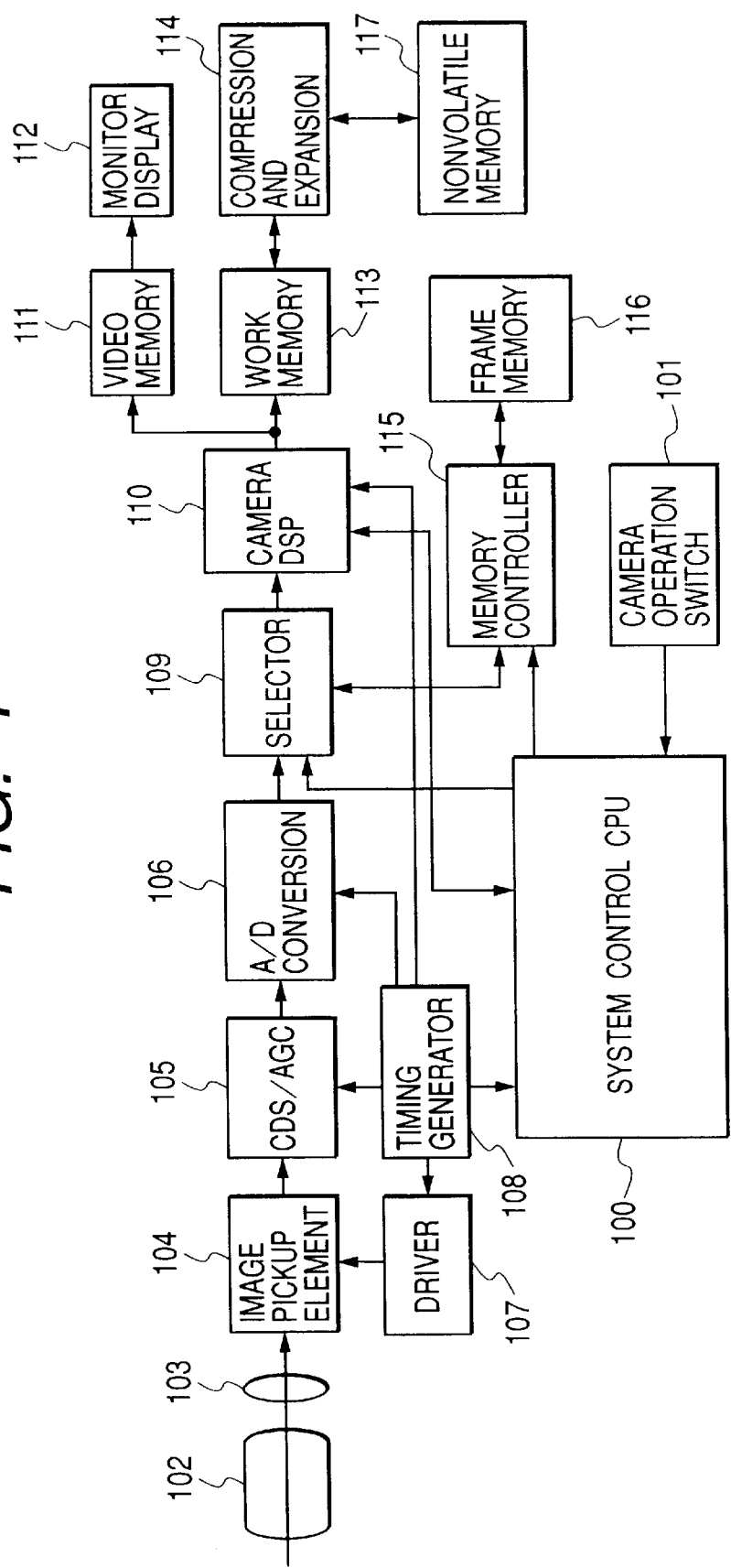
FIG. 1 is a block diagram showing a conventional example.
Figure 2:
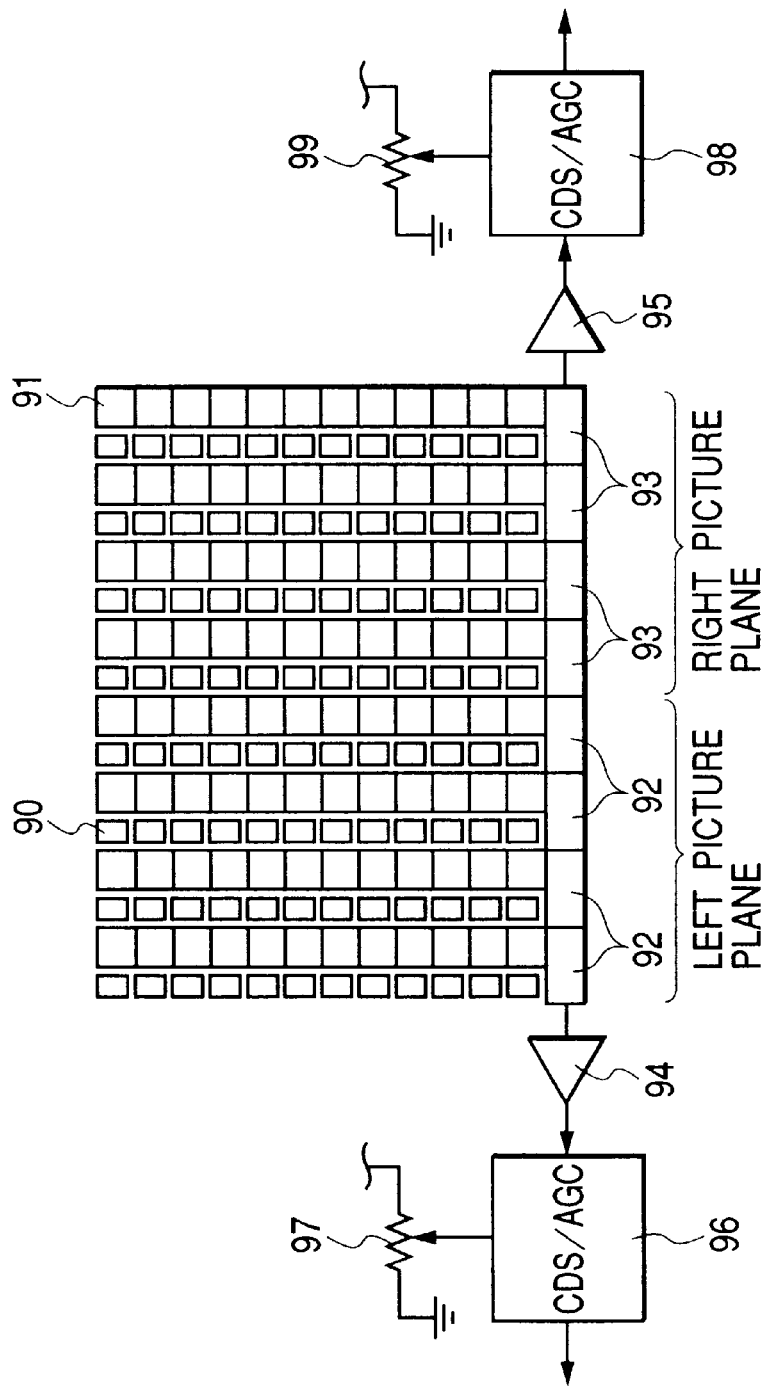
FIG. 2 is a block diagram showing the conventional example.

Before the preferred embodiments of the present invention will be explained, a summary of the embodiments will be explained first hereinafter.

The preferred embodiments of the present invention are directed to automatically correcting unbalance among the plural output portions in the case where an image pickup element having plural output portions is used.

To achieve such automatic correction, each of plural outputs from the image pickup element is independently processed, correlation for each output is discriminated, the amount of unbalance among the plural outputs is calculated, and correction based on the calculated amount is performed for a processing circuit system.

For example, it is assumed that the image pickup element has two outputs, a signal obtained from one output is given as A, and a signal obtained from the other output is given as B. In this case, there is a method which automatically calculates the amount of unbalance between the two outputs on the basis of the relation among the average value of the signal outputs A, the average value of the signal outputs B, and the average value of the signal outputs A and B.

Further, each of the plural outputs from the image pickup element is independently processed, the correlation of image data within a specific range of each output is discriminated, the amount of unbalance among the plural outputs is calculated, and the correction based on the amount of unbalance is performed for the actual processing circuit system.

For example, it is assumed that the image pickup element has two outputs, a signal obtained from one output is given as A, and a signal obtained from the other output is given as B. In this case, there is a method which extracts from the outputs A and B the signals of only the pixel portion located in the vicinity of the boundary on the picture of the image pickup element, calculates the relation between these two output signals, and thus calculates the amount of unbalance between these two output signals.

Further, in order to detect the amount of unbalance among the plural outputs from the image pickup element, a predetermined calibration mode is set to the body of the camera or the like.

For example, in a case where calibration is periodically performed on the field by the photographer, when the calibration mode is set to the body of the camera, ordinary photographing is not performed within the camera, rather only the amount of unbalance among the plural outputs is calculated. In this case, there is a method in which the amount of unbalance among the plural outputs calculated in the calibration mode is set in the plural outputs as the correction data when actual photographing is performed.

Further, in order to detect the amount of unbalance among the plural outputs from the image pickup element, a predetermined calibration mode is set to the body of the camera or the like, and the result is notified to the photographer.

For example, when calibration photographing is performed, it is desirable to the photographer to photograph or take an object the entire surface of which is white. However, when the photographer erroneously photographs a general object which has an extended contrast difference over the overall picture, there is a method which generates a warning to indicate to the photographer that the photographed object is undesirable as the object.

Further, each of the plural outputs from the image pickup elements is independently processed, and the result is first stored in a memory or the like. By using a part of the data stored in this memory, the correlation of the respective outputs is accurately discriminated based on the calculation of the CPU or the like. Thus, the amount of unbalance among the plural outputs is calculated, and the actual correction data read from the memory is corrected based on the calculated amount of unbalance.

Figure 3:
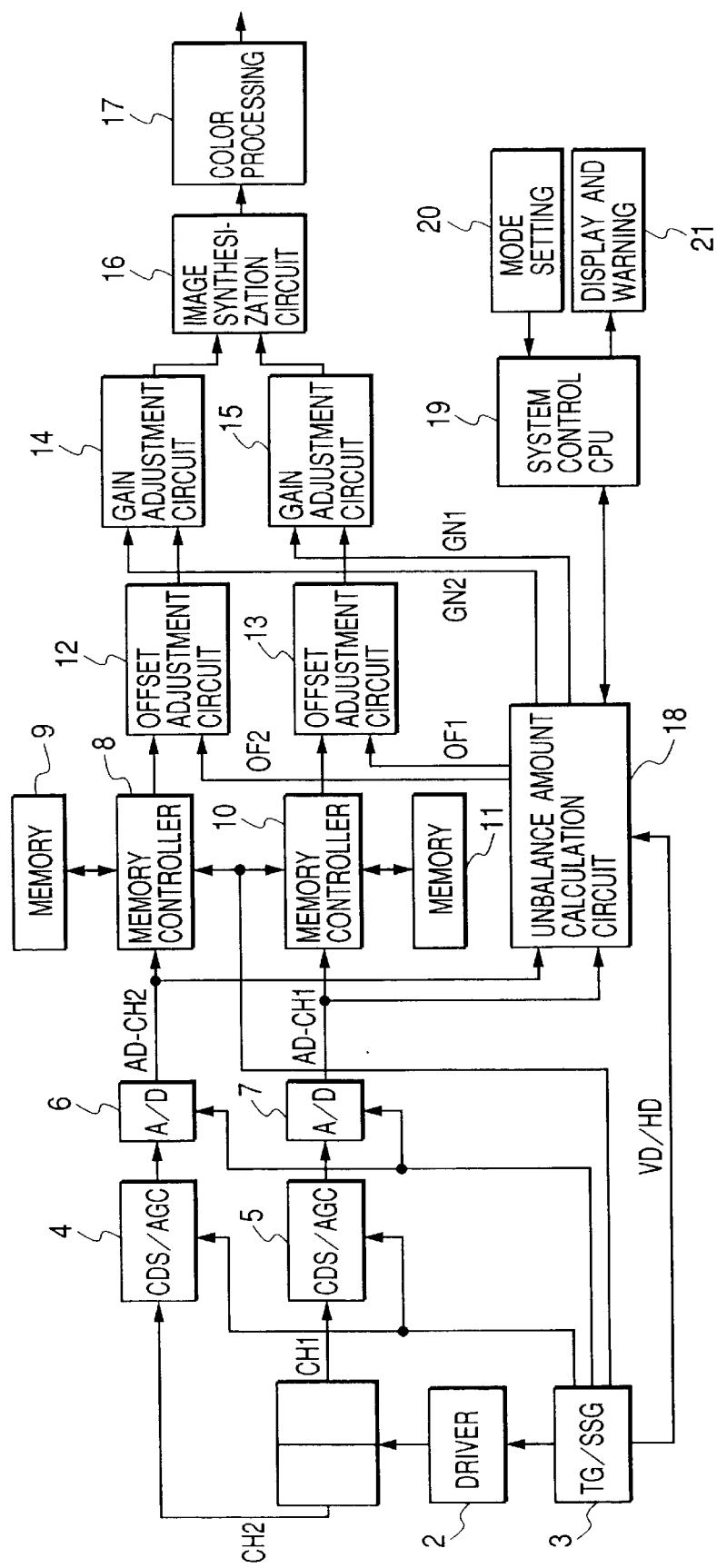
FIG. 3 is a block diagram showing the first to sixth embodiments of the present invention.

FIG. 3 is a block diagram showing an overall hardware structure according to the first to sixth embodiments of the present invention explained hereinafter.

In FIG. 3, an image pickup element 1 having two outputs (CH1 and CH2) is driven by a driver circuit 2. Thus, the image pickup element 1 operates at a predetermined frequency to output photographing image data of left and right independently in the form that the entire picture of the element 1 is divided in two vertically. A TG/SSG circuit 3 is a timing generation circuit which outputs a vertical sync signal VD and a horizontal sync signal HD, and simultaneously supplies a timing signal to each circuit block.

An image output from the right-half of the image pickup element 1 is input to a CDS/AGC circuit 5 through the output CH1 and subjected to known correlation double sampling, thereby eliminating a reset noise or the like included in the CCD output and operating the AGC circuit which amplifies the output up to a predetermined signal level. An output from the CDS/AGC circuit 5 is input to an A/D conversion circuit 7, to convert it into a digital signal, thereby obtaining an output AD-CH1.

Similarly, an image output from the left-half of the image pickup element 1 is input to a CDS/AGC circuit 4 through the output CH2 and subjected to the known correlation double sampling, thereby eliminating the reset noise or the like included in the CCD output and operating the AGC circuit which amplifies the output up to the predetermined signal level. An output from the CDS/AGC circuit 4 is input to an A/D conversion circuit 6, to convert it into a digital signal, thereby obtaining an output AD-CH2.

After each of the left and right outputs from the image pickup element 1 is independently converted into digital data, the outputs are stored respectively in memories 9 and 11 through memory controllers 8 and 10 in due order.

Further, the outputs AD-CH1 and AD-CH2 are simultaneously input to an unbalance amount calculation circuit 18. In the unbalance amount calculation circuit 18, the amount of unbalance for each output is calculated in a later-described method, and thus the optimum amount of correction is determined.

Since the memory controllers 8 and 10 have been constructed so as to continuously, time-divisionally execute the reading and writing to the memories 9 and 11, respectively, as the output from the image pickup element 1 is written into the memory, the data already written into the memory at another timing can be read in the order of data writing.

First, for the output CH1 of the image pickup element 1, the data is continuously read from the memory 11 under the control of the memory controller 10 and input to an offset adjustment circuit 13. Here, since a predetermined offset output OF1 calculated and set by the unbalance amount calculation circuit 18 is connected to the other input of the offset adjustment circuit 13, the data for the output CH1 and the output OF1 are added in the offset adjustment circuit 13.

Next, the output from the offset adjustment circuit 13 is input to a gain adjustment circuit 15. Since a predetermined gain output GN1 calculated and set by the unbalance amount calculation circuit 18 is connected to the other input of the gain adjustment circuit 15, the data from the offset adjustment circuit 13 and the gain output GN1 are multiplied in the gain adjustment circuit 15.

Similarly, for the output CH2 of the image pickup element 1, the data is continuously read from the memory 9 under the control of the memory controller 8 and input to an offset adjustment circuit 12. Here, since a predetermined offset output OF2 calculated and set by the unbalance amount calculation circuit 18 is connected to the other input of the offset adjustment circuit 12, the data for the output CH2 and the output OF2 are added in the offset adjustment circuit 12.

Next, the output from the offset adjustment circuit 12 is input to a gain adjustment circuit 14. Since a predetermined gain output GN2 calculated and set by the unbalance amount calculation circuit 18 is connected to the other input of the gain adjustment circuit 14, the data from the offset adjustment circuit 12 and the gain output GN2 are multiplied in the gain adjustment circuit 14.

The image data output which is obtained by correcting the amount of unbalance between the two outputs with use of the unbalance amount calculation circuit as described above is converted into one image data by an image synthesization circuit 16 (i.e., the left and right outputs are made one output), and objected to predetermined color processing (i.e., color interpolation processing, gamma conversion and the like) by a next-stage color processing circuit 17.

Next, overall control will be explained.

A system control CPU 19 detects a setting state of a mode setting means 20. For example, when the camera is set to the calibration mode as a whole by the photographer, the system control CPU 19 detects and notifies such a state to the unbalance amount calculation circuit 18.

The unbalance amount calculation circuit 18 calculates the amount of unbalance of the image photographed according to a release operation by the photographer, in such a method as described above. In this case, when the entire photographed picture is inadequate for the calibration (e.g., a case in which when an object having an uneven face is selected by the photographer, and it is possible to obviously discriminate that such unevenness does not originate in the unbalance between the two outputs), a display and warning means 21 notifies the photographer that the current object is inadequate. Therefore, on the basis of such a result, the photographer again selects a photographing scene optimum for the calibration.

Figure 4:
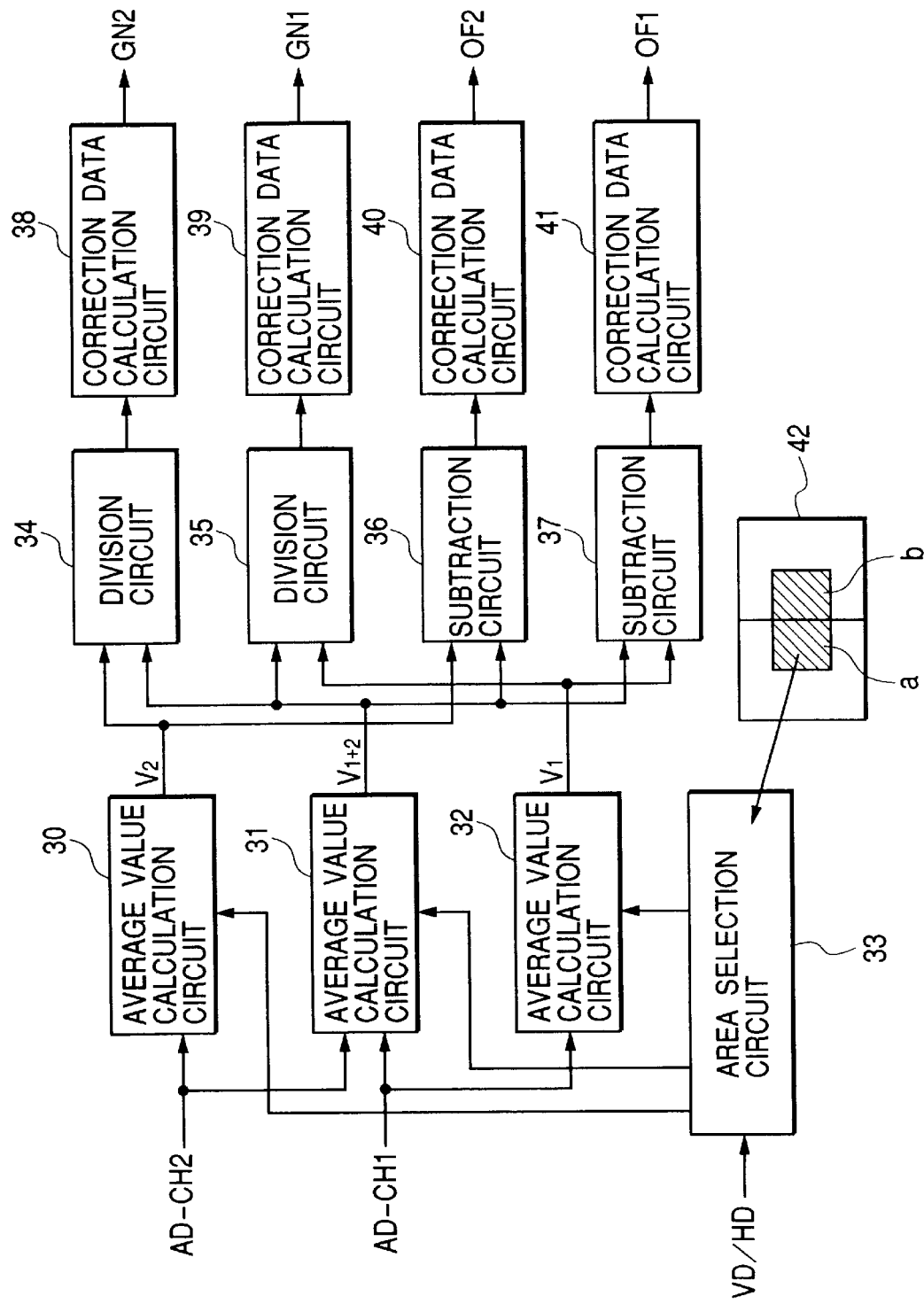
FIG. 4 is a block diagram showing the first embodiment of the present invention.

The first embodiment of the present invention will be explained. FIG. 4 shows the concrete structure of the unbalance amount calculation circuit 18.

In FIG. 4, the outputs AD-CH1 and AD-CH2 from the A/D conversion circuit are first input to average value calculation circuits 30, 31 and 32. Here, the average value calculation circuit averages the data for each pixel over a predetermined range, and the area to be averaged is set by an area selection circuit 33.

The area selection circuit 33 determines the effective area of the data for each pixel output from the image pickup element 1 and sets the timing for permitting the input signal to be averaged by each average value calculation circuit, on the basis of a VD/HD signal from the TG/SSG circuit 3 shown in FIG. 3.

For example, the average value calculation circuit 30 calculates the average value of the pixel data existing in a hatched portion a of an image area 42 in the image pickup element, and the average value calculation circuit 32 calculates the average value of the pixel data existing in a hatched portion b of the image area 42.

On the other hand, the average value calculation circuit 31 calculates the average value of the pixel data existing in the hatched portions a and b of the image area 42 in the image pickup element.

Thus, in this case, the average value of the pixel data within the predetermined range existing in the left half of the image pickup element 1 shown in FIG. 3 is calculated by the average value calculation circuit 30, the average value of the pixel data within the predetermined range existing in the right half of the image pickup element 1 is calculated by the average value calculation circuit 31, and the average value of the pixel data within the predetermined range existing in both the left and right halves of the image pickup element 1 is calculated by the average value calculation circuit 32.

Next, outputs $V_2$, $V_{1+2}$ and $V_1$ respectively generated from the average value calculation circuits 30, 31 and 32 are divided by division circuits 34 and 35 the outputs of which are connected to next-stage circuits.

First, the division $V_{1+2}/V_2$ is performed by the division circuit 34, and a value substantially proportional to the division result is output as a signal GN2 from a correction data calculation circuit 38. Similarly, the division $V_{1+2}/V_1$ is performed by the division circuit 35, and a value substantially proportional to the division result is output as a signal GN1 from a correction data calculation circuit 39.

The output signals GN1 and GN2 obtained as above are input to the gain adjustment circuits 15 and 14 of FIG. 3, respectively, and the actual correction is performed in these circuits to match the output levels of the channels with each other.

On the other hand, the outputs from the average value calculation circuits 30, 31 and 32 are subjected to subtraction by next-stage subtraction circuits 36 and 37.

First, the subtraction $V_{1+2}-V_2$ is performed by the subtraction circuit 36, and a value substantially proportional to the subtraction result is output as a signal OF2 from a correction data calculation circuit 40. Similarly, the subtraction $V_{1+2}-V_1$ is performed by the subtraction circuit 37, and a value substantially proportional to the subtraction result is output as a signal OF1 from a correction data calculation circuit 41.

The output signals OF1 and OF2 obtained as above are input to the offset adjustment circuits 13 and 12 of FIG. 3, respectively, and the actual correction is performed in these circuits to match the output levels of the channels with each other.

The above two methods try to correct the unbalance between the two outputs from the image pickup element to the end, by using the average value of the pixel data within the predetermined range existing in the left half of the image pickup element 1, the average value of the pixel data within the predetermined range existing in the right half of the image pickup element 1, and the average value of the pixel data within the predetermined range existing in both the left and right halves of the image pickup element 1.

As above, there are two kinds of methods, one for performing gain adjustment to the data between the two outputs, and the other for performing offset adjustment to the data between the two outputs. In the present embodiment, it is possible to perform the unbalance adjustment using both of the methods, or by selecting either one of the two methods.

Figure 5:
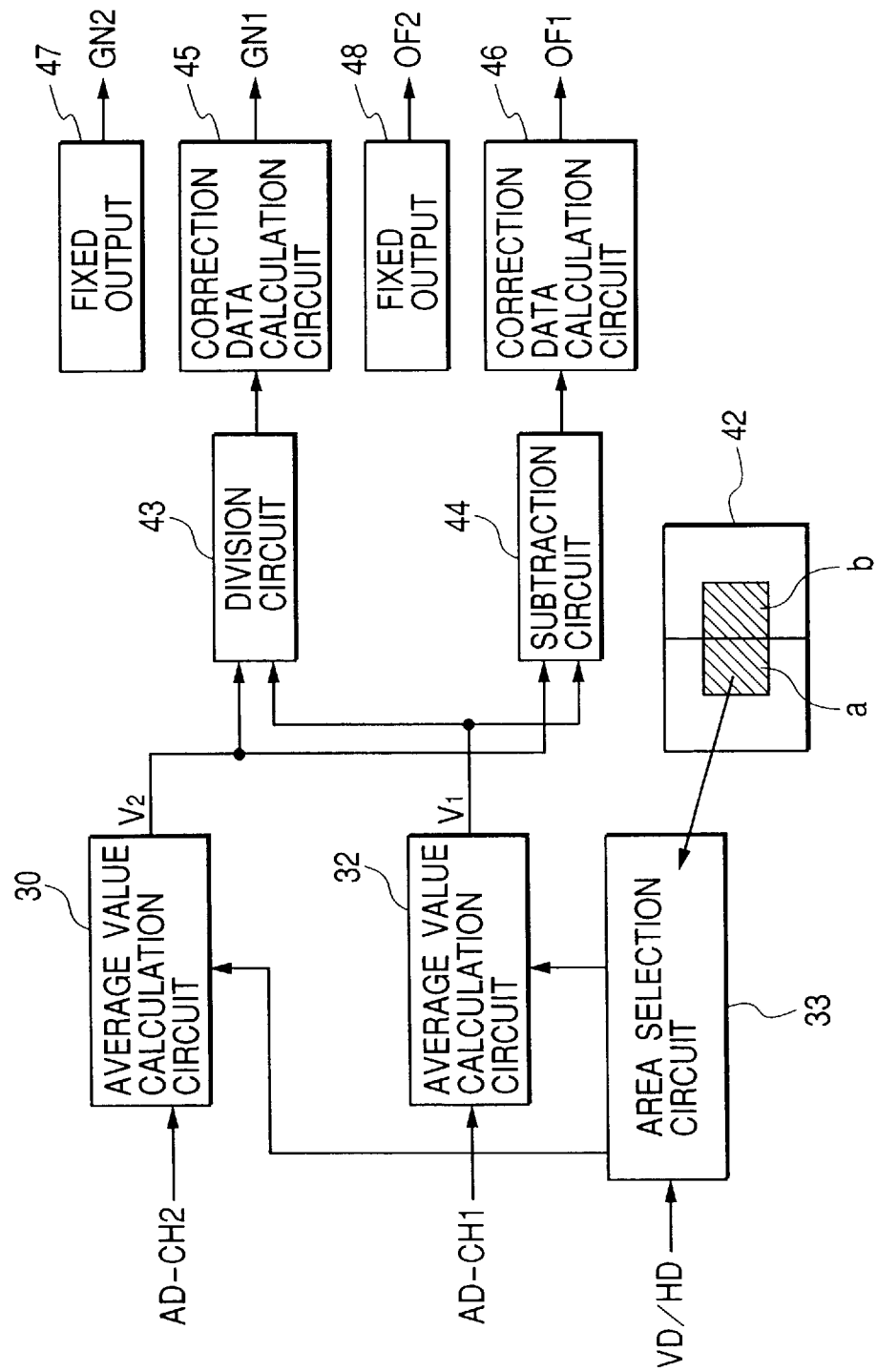
FIG. 5 is a block diagram showing the second embodiment of the present invention.

Next, the second embodiment will be explained. FIG. 5 shows the concrete structure of the unbalance amount calculation circuit 18.

In FIG. 5, the outputs AD-CH1 and AD-CH2 from the A/D conversion circuit are first input to average value calculation circuits 30 and 32 identical with those in FIG. 4. Here, the average value calculation circuit averages the data for each pixel over a predetermined range, and the area to be averaged is set by an area selection circuit 33.

The area selection circuit 33 determines the effective area of the data for each pixel output from the image pickup element 1 and sets the timing for permitting the input signal to be averaged by each average value calculation circuit, on the basis of the VD/HD signal from the TG/SSG circuit 3 shown in FIG. 3.

For example, the average value calculation circuit 30 calculates the average value of the pixel data existing in a hatched portion a of an image area 42 in the image pickup element, and the average value calculation circuit 32 calculates the average value of the pixel data existing in a hatched portion b of the image area 42.

Thus, in this case, the average value of the pixel data within the predetermined range existing in the left half of the image pickup element 1 shown in FIG. 3 is calculated by the average value calculation circuit 30, and the average value of the pixel data within the predetermined range existing in the right half of the image pickup element 1 is calculated by the average value calculation circuit 32.

Next, outputs $V_2$ and $V_1$ respectively generated from the average value calculation circuits 30 and 32 are divided by a division circuit 43 the output of which is connected to next-stage circuit. The division $V_2/V_1$ is performed by the division circuit 43, and a value substantially proportional to the division result is output as a signal GN1 from a correction data calculation circuit 45. On the other hand, a fixed output is generated as a signal GN2 from a fixed output generation circuit 47.

The output signals GN1 and GN2 obtained as above are input to the gain adjustment circuits 15 and 14 of FIG. 3, respectively, and the actual correction is performed in these circuits to match the output levels of the channels with each other.

On the other hand, the outputs from the average value calculation circuits 30 and 32 are subjected to subtraction by a next-stage subtraction circuit 44.

First, the subtraction $V_2-V_1$ is performed by the subtraction circuit 44, and a value substantially proportional to the subtraction result is output as a signal OF1 from a correction data calculation circuit 46. On the other hand, a fixed output is generated as a signal OF2 from a fixed output generation circuit 48.

The output signals OF1 and OF2 obtained as above are input to the offset adjustment circuits 13 and 12 of FIG. 3, respectively, and the actual correction is performed in these circuits to match the output levels of the channels with each other.

The above two methods try to correct the unbalance between the two outputs from the image pickup element to the end, by using the relation of the average value of the pixel data within the predetermined range existing in the left half of the image pickup element and the average value of the pixel data within the predetermined range existing in the right half of the image pickup element.

Like the first embodiment, there are two kinds of methods, one for performing gain adjustment to the data between the two outputs, and the other for performing offset adjustment to the data between the two outputs. In the present embodiment, it is possible to perform the unbalance adjustment using both methods, or by selecting either one of the two methods.

Figure 6:
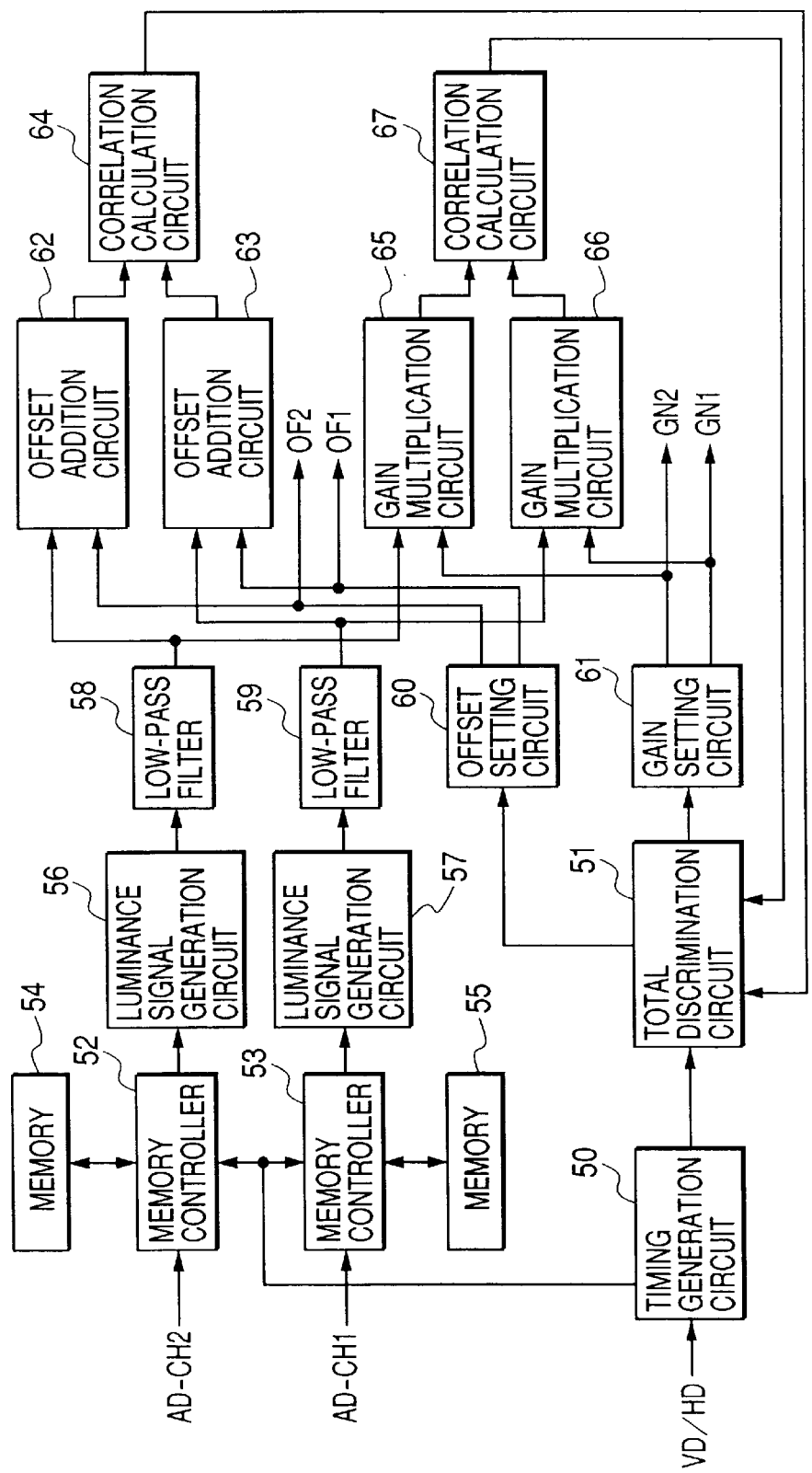
FIG. 6 is a block diagram showing the third embodiment of the present invention.

Next, the third embodiment will be explained. FIG. 6 shows the concrete structure of the unbalance amount calculation circuit 18.

In FIG. 6, the outputs AD-CH1 and AD-CH2 from the A/D conversion circuit are first input to memories 55 and 54 through memory controllers 53 and 52, respectively.

Here, the range of the image pickup element data to be stored in the memory through the memory controller is determined at predetermined timing generated by a timing generation circuit 50. In this case, the ranges of the input data correspond to block-line data in the vertical direction indicated by characters a and b in FIG. 7. The blocks indicated by a and b include each color data (G/R/B/G in this case) determined according to a color filter arrangement of the image pickup element.

Therefore, the data is read for each block from the memories 55 and 54 through the memory controllers 53 and 52, and simple addition is performed for each color in the block by next-stage luminance signal generation circuits 57 and 56 to generate simple luminance signals.

$$Y=R+2G+B$$

Figure 7:
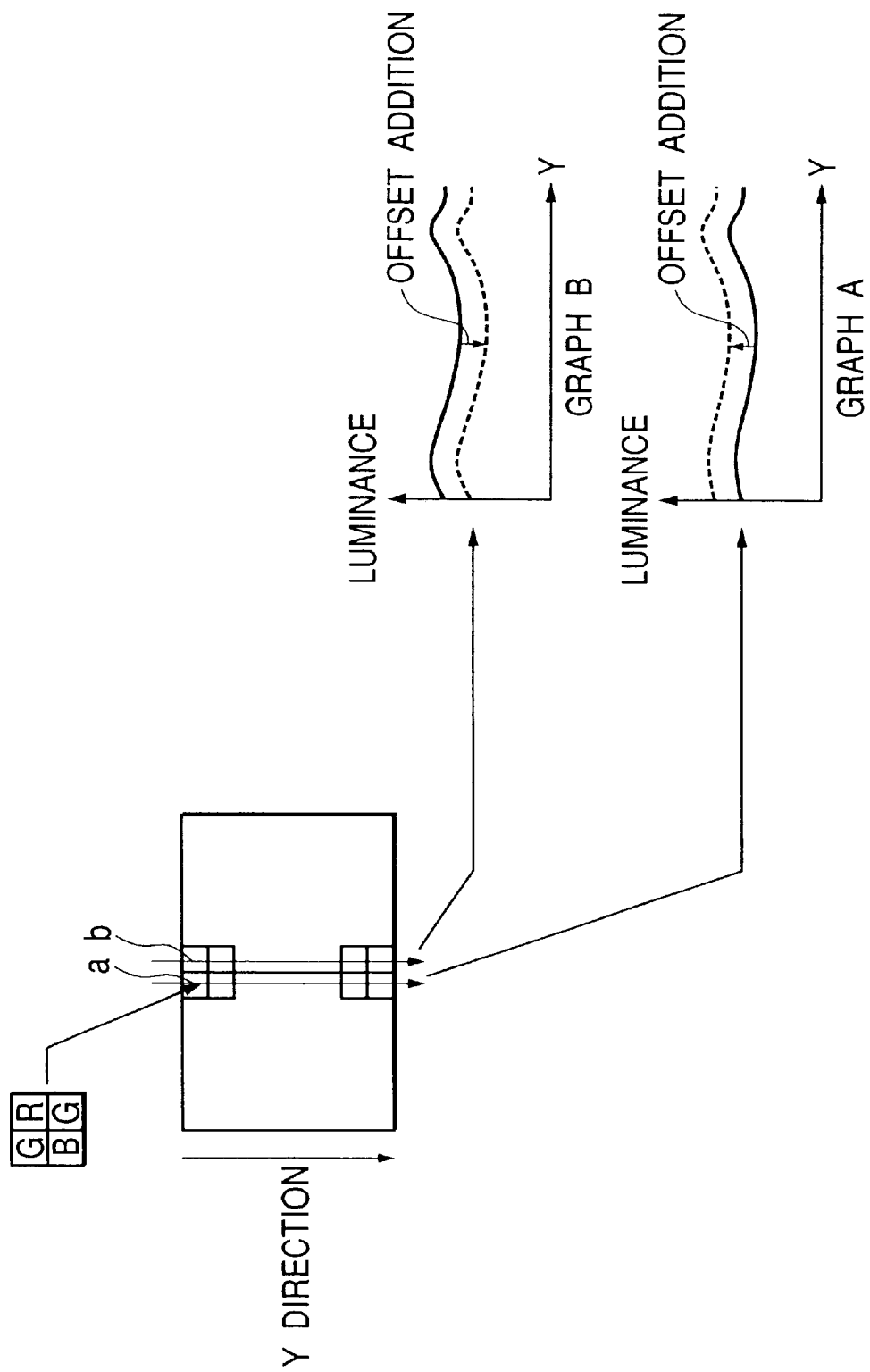
FIG. 7 is a diagram showing the third embodiment of the present invention.

The luminance signals generated by the luminance signal generation circuits 57 and 56 are sequentially read along the Y direction in FIG. 7, and processing such as one-dimensional low-pass filtering or the like for the reading direction (Y direction) is performed by low-pass filters 59 and 58. The result of the processing is graphed with the solid lines as graphs A and B shown in FIG. 7.

Next, the outputs from the low-pass filters 59 and 58 are input to offset addition circuits 63 and 62, respectively. The other input of each of the offset addition circuits 63 and 62 is connected to the output of an offset setting circuit 60.

In the initial state, the output of the offset setting circuit 60 is zero. In this state, the outputs from the offset addition circuits 63 and 62 are first input to a next-stage correlation calculation circuit 64 and subjected to correlation calculation.

As the calculation method by the correlation calculation circuit 64, for example, if it is assumed that each luminance data of the block a at the left of the central boundary portion on the picture of the image pickup element in FIG. 7 is Ia(i) and each luminance data of the block b at the right thereof is Ib(i), the correlation calculation is performed by using an expression $P=\Sigma|Ia(i)-Ib(i)|$.

The result of the correlation calculation is examined/discriminated by a total discrimination circuit 51. When it is determined that the correlation is still insufficient, a predetermined offset amount is calculated by the offset setting circuit 60 and supplied to the offset addition circuits 63 and 62.

For example, in the graphs A and B of FIG. 7, the plus offset amount is added for the luminance data Ia(i) and the minus offset amount is added for the luminance data Ib(i). The result after the offset amounts are added is again subjected to a correlation calculation by the correlation calculation circuit 64, and the calculated result is examined by the total discrimination circuit 51.

When it is determined that the result of the correlation calculation is sufficient, it is possible to consider that the results of the outputs overlap each other. Thus, outputs OF1 and OF2 of the offset setting circuit 60, which was set at that time, are input to the offset adjustment circuits 13 and 12, so as to correct the unbalance between the two channels of the image pickup element.

Next, the outputs of the low-pass filters 59 and 58 are input to gain multiplication circuits 66 and 65, respectively. The other input of each of the gain multiplication circuits 66 and 65 is connected to the output of a gain setting circuit 61.

In the initial state, the output of the gain setting circuit 61 is zero. In this state, the outputs from the gain multiplication circuits 66 and 65 are first input to a next-stage correlation calculation circuit 67 and subjected to correlation calculation.

As the calculation method by the correlation calculation circuit 67, for example, if it is assumed that each luminance data of the block a at the left of the central boundary portion on the picture plane of the image pickup element in FIG. 7 is Ia(i) and each luminance data of the block b at the right thereof is Ib(i), the correlation calculation is performed by using an expression $P=\Sigma|Ia(i)\times Ib(i)|$ in an example.

The result of the correlation calculation is examined/discriminated by the total discrimination circuit 51. When it is determined that the correlation is still insufficient, a predetermined gain amount is calculated by the gain setting circuit 61 and supplied to the gain multiplication circuits 66 and 65.

Conversely, when it is determined that the result of the correlation calculation is sufficient, it is possible to consider that the results of the outputs overlap each other. Thus, outputs GN1 and GN2 of the gain setting circuit 61 which were set at that time are input to the gain adjustment circuits 15 and 14 of FIG. 3 so as to correct the unbalance between the two channels of the image pickup element.

The above two methods try to correct the unbalance between the two outputs from the image pickup element to the end, by determining the correlation of the pixel data within the predetermined range existing in the left half of the image pickup element and the pixel data within the predetermined range existing in the right half of the image pickup element, and setting the predetermined offset amount or gain amount according to the determination result.

In the present embodiment, the output from the luminance signal generation circuit is subjected to low-pass filtering processing. In addition to such the method, a method for performing the correlation calculation to the band-pass filtered result, and a method for adjusting the amount of unbalance between the left and right outputs by adding little-more highly developed condition judgment (e.g., by selecting the partial area) are devised.

Besides, like the first embodiment, there are two kinds of methods, one for performing gain adjustment to the data between the two outputs, and the other for performing offset adjustment to the data between the two outputs. In the present embodiment, it is possible to perform the unbalance adjustment by using both methods, or by selecting either one of the two methods.

Figure 8:
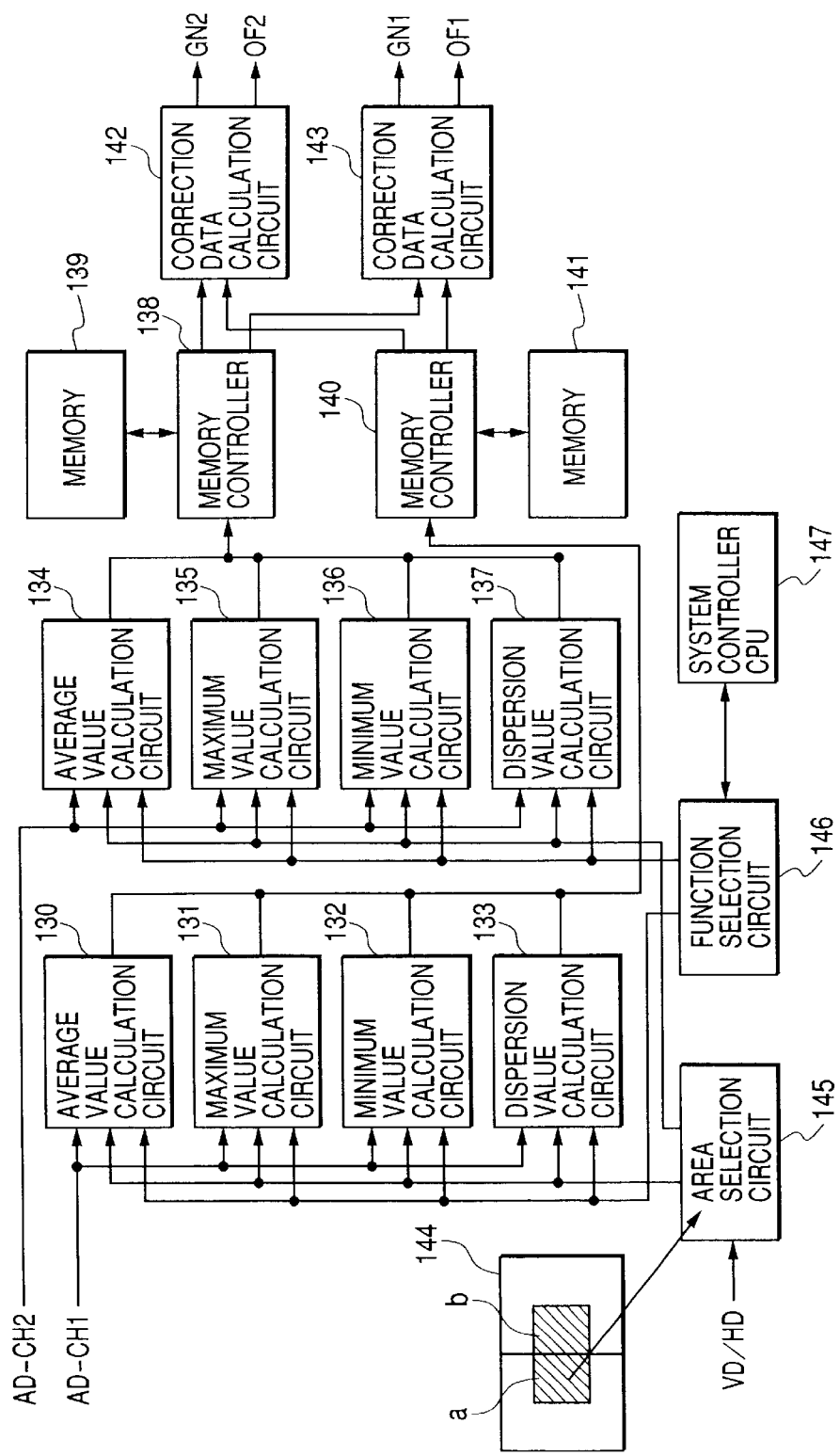
FIG. 8 is a block diagram showing the fourth embodiment of the present invention.

Next, the fourth embodiment will be explained. FIG. 8 shows the concrete structure of the unbalance amount calculation circuit 18.

In FIG. 8, calculation circuits 130 to 137 are designated by a function selection circuit 146 which can select the plural calculation circuits for each of the left and right outputs. As the calculation circuits, an average value calculation circuit, a maximum value calculation circuit, a minimum value calculation circuit, a dispersion value calculation circuit, a standard deviation value calculation circuit, an average deviation calculation circuit, an inclination value calculation circuit, a difference maximum value calculation circuit, a difference minimum value calculation circuit, a difference average value calculation circuit and the like are devised. A statistic of each of the left and right output data is calculated by these calculation circuits. Outputs AD-CH1 and AD-CH2 from the A/D conversion circuit are input to the plural calculation circuits selected by the function selection circuit 146.

Figure 9:
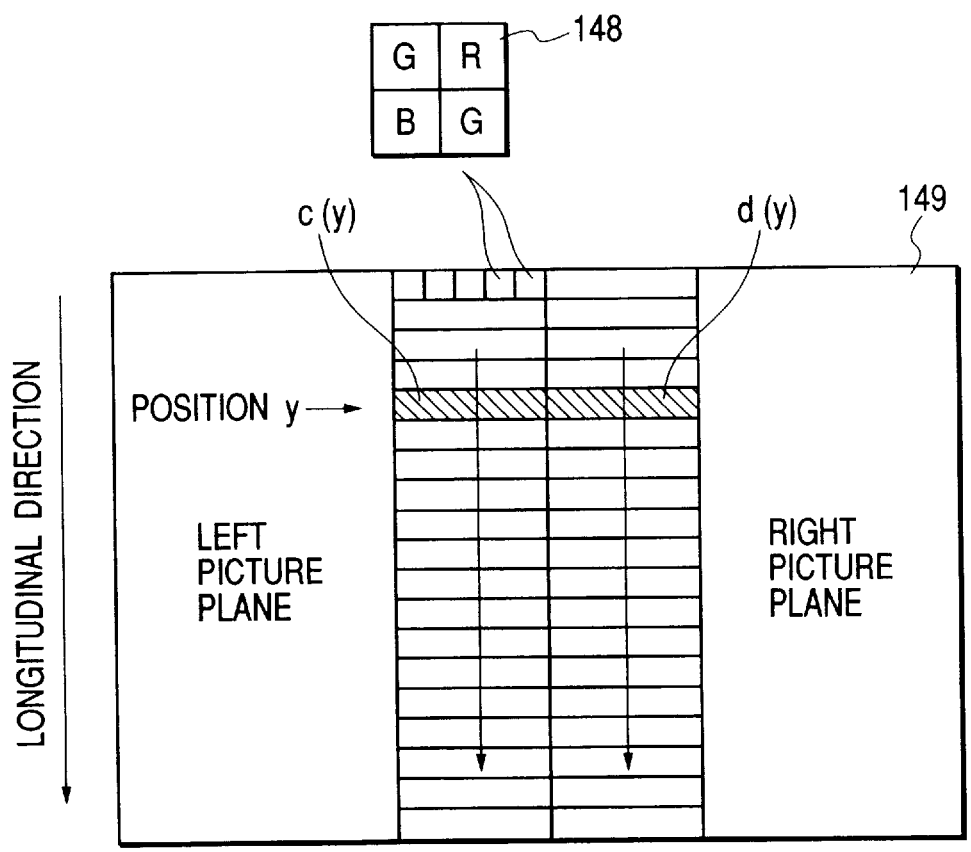
FIG. 9 is a diagram showing the fourth embodiment of the present invention.

At this time, a predetermined area which is used to calculate the amount of unbalance in the image data is selected by an area selection circuit 145 for each calculation circuit selected by the function selection circuit 146. The area selection circuit 145 determines the effective area of the data for each pixel output from the image pickup element 1 and sets the timing for permitting the input signal to be calculated by each calculation circuit, on the basis of the VD/HD signal from the TG/SSG circuit 3 shown in FIG. 3. FIG. 9 shows one example of the selection method of the area selection circuit 145. In FIG. 9, the specific positions are horizontally designated from the boundary of the image data to the left and right directions respectively. Further, the set of pixels having a color filter arrangement of R/G/G/B is made one cell, and continuous areas $c(y)$ and $d(y)$ from the boundary to the horizontally designated left and right positions are considered at a position y in the vertical direction. The correlation of the set of the areas $c(y)$ and $d(y)$ is discriminated/determined for the arbitrary position y in the vertical direction. The area setting circuit can designate only the pixel having the specific color filter in the unit pixel set, or designate the combination of these pixels. Also, the area selection circuit 145 may select a different area for each calculation circuit.

Next, a memory controller 138 first stores the calculation data for the output AD-CH1 calculated by the calculation circuits 130 to 137, in a memory 139.

Next, a correction data calculation circuit 142 reads out the calculation data for the output AD-CH2 and the calculation data for the output AD-CH1 from the memories 139 and 141 through the memory controllers 138 and 140, respectively. The calculation circuit 142 performs the correlation calculation for the calculation data in a later-described method, thereby calculating gain correction data GN2 and offset correction data OF2 for the output AD-CH2. Similarly, a correction data calculation circuit 143 reads out the calculation data for the output AD-CH2 and the calculation data for the output AD-CH1 from the memories 139 and 141 through the memory controllers 138 and 140, respectively, and performs the correlation calculation for the calculation data in a later-described method, thereby calculating gain correction data GN1 and offset correction data OF1 for the output AD-CH1. Here, it is sufficient by correcting either one of the outputs AD-CH1 and AD-CH2 to eliminate the unbalance between these outputs. Thus, either one of the correction data GN2 and OF2 for the output AD-CH2 and the correction data GN1 and OF1 for the output AD-CH1 may be fixed data.

Next, an example of an algorithm to correct the amount of unbalance will be explained with reference to a flow chart shown in FIG. 10. In this example, luminance values are discriminated/determined for the continuous areas $c(y)$ and $d(y)$ as shown in FIG. 9, and the correlation calculation of the two outputs is performed using the determination results. However, since the photographed image includes various patterns, if the correlation calculation is simply performed for all the continuous areas $c(y)$ and $d(y)$ at the position y in the vertical direction, the area having low correlation (or the low-correlation area) is unnecessarily calculated, whereby there is some fear that the calculated amount of unbalance will become greatly separated from an actual amount of aberration. In order to solve such a problem, there is a method for paying attention to the area having high correlation (or the high-correlation area) and performing the correlation calculation only to such area. As the area having high correlation, an area which has uniform luminance and in which there is no unevenness of luminance at the boundary and its vicinity can be considered. For example, when a portion of cloudless sky is in the central boundary of an image of scenery photograph, it is considered that the correlation between the two outputs is high at such portion. Conversely, in an image obtained by photographing a building, when the boundary of the building and sky is in the boundary or its vicinity of the two outputs, it is considered that the correlation between the two outputs is low. As a method for concretely determining such high- and low-correlative areas, a method for discriminating/determining luminance, a method for discriminating/determining tones, a method for discriminating/determining frequencies and the like may be devised.

Figure 10:
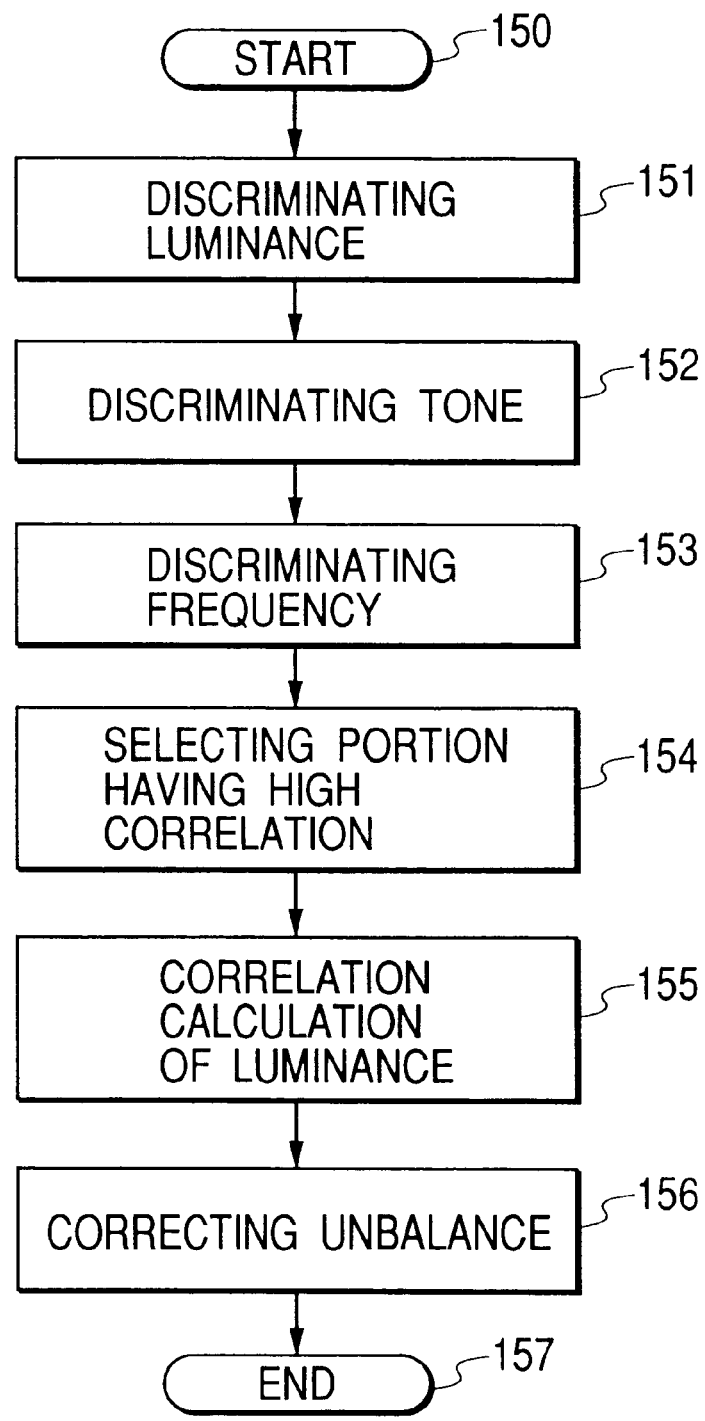
FIG. 10 is a flow chart showing the fourth embodiment of the present invention.

In the present embodiment, the correlation is determined in steps 151 to 153 of FIG. 10. First, the luminance of each of the two outputs is discriminated/determined in step 151. In the portion where the luminance of the left picture is considerably different from that of the right picture, it is determined that the correlation of this portion is low. Here, in the areas $c(y)$ and $d(y)$ of the arbitrary position y in the vertical direction of FIG. 9, the average value of the image data is calculated, and the calculated result is given as the luminance. If the calculated result in the area $c(y)$ is considerably different from that in the area $d(y)$, it is determined that the correlation of the image data in the areas $c(y)$ and $d(y)$ is low. At this time, a threshold value is necessary to discriminate/determine the difference of the luminance. However, when the threshold value is set to be a primary function of the luminance value in preconsideration of the gain aberration amount and the offset aberration amount, the portion having low correlation might be able to be discriminated/determined with high accuracy.

Next, the tone between the two outputs is discriminated/determined in step 152, and it is determined that the correlation of the portion in which the left tone is different from right tone is low. Like in step 1501, in the areas $c(y)$ and $d(y)$ of the arbitrary position y in the vertical direction, the average value of the image data for each color filter is calculated, and further the calculated results of the areas $c(y)$ and $d(y)$ are compared with each other for each color filter. When the results are considerably different from each other, it is determined that the correlation of the image data in the areas $c(y)$ and $d(y)$ is low. If the threshold value which is a reference of discrimination/determination is set to be a primary function of the luminance value for each color filter, the portion having low correlation can be discriminated/determined with high accuracy.

Next, the frequency is discriminated/determined in step 153, and it is determined that the correlation of the portion with a lot of high frequency components is low. In this case, the average value y of the image data is calculated in the area $c(y)$ of the arbitrary position y in the vertical direction. It is assumed that luminance data in the continuous area $c(y)$ is Y, and the number of luminance data is n. Then, in the area $c(y)$, a dispersion value $\sigma^2$ is calculated by an expression $\sigma^2 = \Sigma(Y-y)^2/n$. Similarly, a dispersion value is calculated in the continuous area $d(y)$. When the dispersion value is considerably high, since the image data in the areas $c(y)$ and $d(y)$ includes a lot of high frequency components, its correlation is determined to be low. This dispersion value has a tendency which grows with an increase in the average value of the luminance. Thus, if the threshold value for determination is set to be a primary function of the average value of the luminance, the portion having low correlation can be discriminated/determined with high accuracy. Besides the method for calculating the dispersion value, as a method for discriminating/determining the frequency, it is possible to similarly discriminate/determine the frequency by obtaining and appropriately combining a maximum value, a minimum value, an average deviation, a standard deviation, a difference maximum value, a difference minimum value and a difference average value. Here, the standard deviation is represented by a square root of the dispersion value. If it is assumed that the data is Y, the number of data is n, and the average of the data is y, then a standard deviation value a is calculated by an expression $\sigma=\Sigma|Y-y|/n$. The difference maximum value, the difference minimum value and the difference average value represent the maximum value, the minimum value and the average value in the absolute value of the difference between the data of the adjacent positions, respectively.

After such processing as above is performed, the position which is not determined in step 154 that its correlation is low is considered as the position where the correlation between the left and right pictures is high. In the above processing, the luminance, the tone and the frequency are discriminated/determined for the correlation discrimination. However, it is possible to determine the correlation by discriminating/determining only one or two of such factors.

Next, in step 155, the following correlation calculation is performed only for the line where it is regarded that the correlation between the left and right pictures is high, whereby the correction data is calculated to correct the unbalance of the two outputs.

When luminance data $G_L(y)$, $R_L(y)$ and $B_L(y)$ to the output AD-CH2 and luminance data $G_R(y)$, $R_R(y)$ and $B_R(y)$ to the output AD-CH1 for each color filter are used only for the position y where it is regarded that the correlation is high, the difference between the left and right luminance values for each color filter is squared and summed by the following expression.

$$\Sigma(GN1 \times G_R(y)+OF1-GN2 \times G_L(y)-OF2)^2+\Sigma(GN1 \times R_R(y)+OF1-GN2 \times R_L(y)-OF2)^2+\Sigma(GN1 \times B_R(y)+OF1-GN2 \times B_L(y)-OF2)^2$$

By obtaining the combination of the gain correction data GN1 and GN2 and the offset correction data OF1 and OF2 for minimizing the value of the above expression, it is possible to calculate the correction data for the outputs AD-CH1 and AD-CH2 to match the levels of the two outputs with each other. Here, since either one of the two outputs is fixed and the other thereof is matched with the one output to correct the unbalance between the two outputs, either the set of the data GN1 and OF1 or the set of the data GN2 and OF2 may be the fixed data. Further, when only an offset error and a gain error are corrected, the offset correction amount and the gain correction amount may be the fixed data respectively.

Next, in step 156, the gain correction and the offset correction are performed respectively to the left and right image data as a whole, using the correction data GN1, GN2, OF1 and OF2 calculated in the above manner. Thus, it is possible to accurately correct the unbalance between the two outputs.

Figure 11:
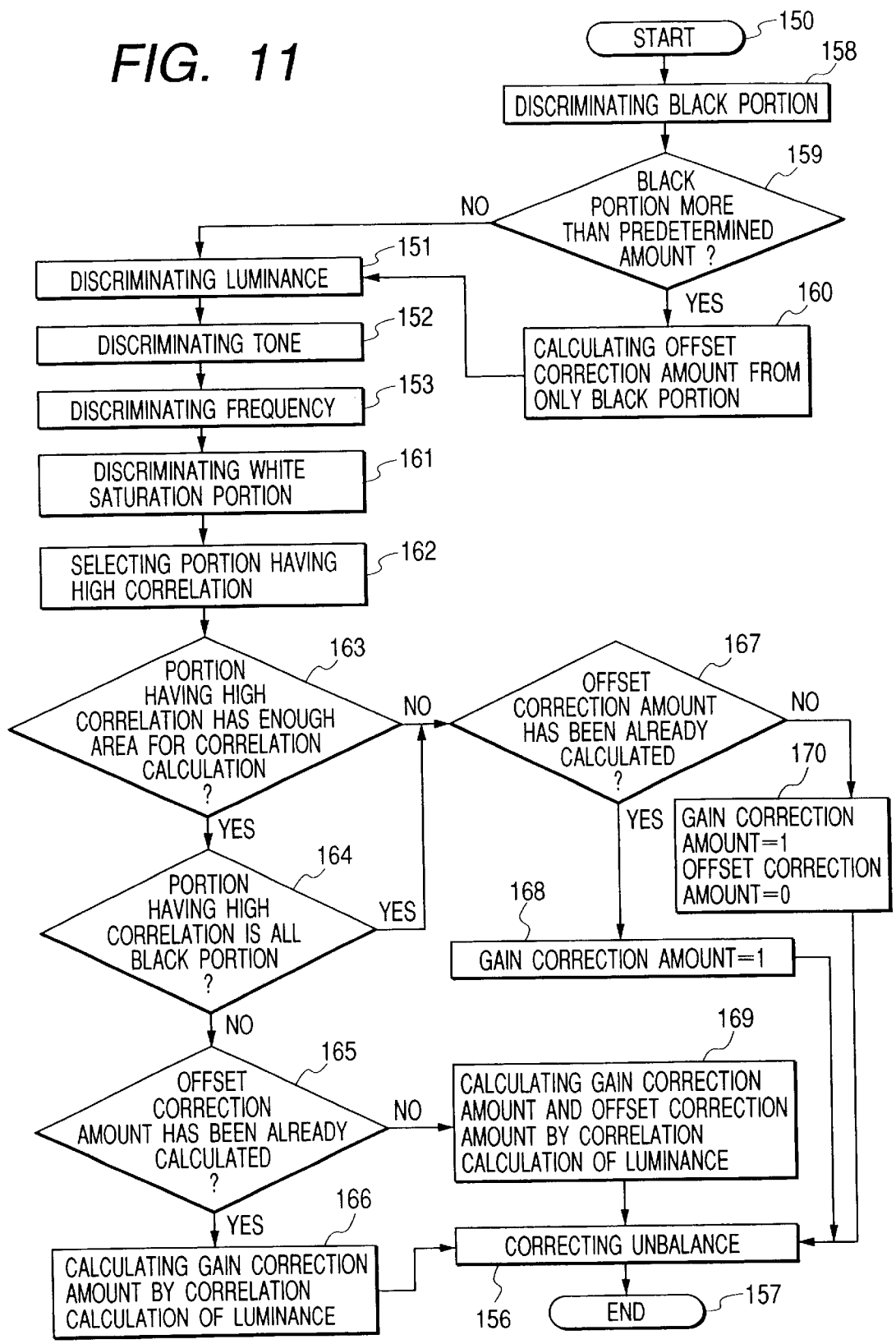
FIG. 11 is a flow chart showing the fifth embodiment of the present invention.

Next, the fifth embodiment will be explained. FIG. 11 is a flow chart showing an example of an algorithm to explain the fifth embodiment of the present invention. The hardware structure of the overall image pickup apparatus and the concrete structure of the unbalance amount calculation circuit are the same as those in the fourth embodiment. Like the fourth embodiment, the area shown in FIG. 9 is discussed.

In the present embodiment, the gain correction amount and the offset correction amount are independently calculated. The unbalance between the left and right pictures at the dark portion substantially depends on an offset error. Thus, there is a possibility that calculating only the offset correction amount in such a manner as above can calculate the amount of correction more accurately, rather than calculating the gain correction amount and the offset correction amount simultaneously. For this reason, in step 158, only the black portion in the image, i.e., the area the luminance value of which is close to zero, is discriminated/determined, and then the offset correction amount is calculated from the determination result in step 160.

The luminance discrimination/determination, the hue discrimination/determination and the high frequency discrimination/determination in steps 151, 152 and 153 are the same as those in the fourth embodiment.

Next, in step 162, a white saturation portion is discriminated/determined. The white saturation portion is a portion such as a spot portion or the like in the object, where the luminance is extremely high. Since the data is saturated in the white saturation portion, there is a possibility that the amount of unbalance of this portion is different from that of another portion, whereby it is regarded that the correlation between the two outputs is low.

Next, in steps 163 to 165, 167 and 170, the correlation calculation to be performed is made differently according to whether or not the amount of the portion the correlation of which is discriminated/determined to be high and the offset correction amount have been calculated. First, in step 163, it is determined whether the portion having a high correlation has sufficient size to obtain an accurate amount of unbalance in the correlation calculation. If it has sufficient size, the correlation calculation is performed, while if it does not have sufficient size, it is considered that unbalance correction is unnecessary because the correlation between the two outputs is originally low. It is determined in step 164 whether or not the portion having the high correlation is all a black portion. If so, like in step 163, it is considered that the correlation between the two outputs is originally low. Besides, in step 167, when the offset correction amount has been already calculated, operation is controlled such that only the offset error is corrected. Conversely, when the offset correction amount is not calculated, the gain correction amount and the offset correction amount are determined in step 170 such that the unbalance correction is not performed. Next, when the portion where the correlation between the two outputs is determined to be high satisfies the condition necessary for the correlation calculation, it is determined in step 165 whether the offset correction amount has been calculated. When the offset correction amount has been calculated, only the gain correction amount is calculated by the correlation calculation in step 166, while the offset correction amount is not calculated, both the offset correction amount and the gain correction amount are calculated by the correlation calculation in step 169.

Next, like in the fourth embodiment, the unbalance correction between the two outputs is performed based on the calculated amount of unbalance in step 156, whereby it is possible to accurately correct the unbalance between the two outputs.

Next, the sixth embodiment will be explained with reference to the circuit structures shown in FIGS. 12A and 12B.

FIG. 12A shows the structure in a case where a reading operation of the image pickup element is divided into two reading operations, for up and down areas. The upper-half output read from an image pickup element 170 is converted into digital data by an A/D converter 173 through a CDS/AGC circuit 171, and then input to, e.g., the memory controller 8 of FIG. 3.

Similarly, the lower-half output read from the image pickup element 170 is converted into digital data by an A/D converter 174 through a CDS/AGC circuit 172, and then input to, e.g., the memory controller 10 of FIG. 3.

FIG. 12B shows the structure in a case where the reading operation of the image pickup element is divided into four reading operations, for up and down, left and right areas. he upper-left ¼ output read from an image pickup element 175 is converted into digital data by an A/D converter 180 through a CDS/AGC circuit 176, and then input to, e.g., the memory controller of FIG. 3.

The upper-right ¼ output read from the image pickup element 175 is converted into digital data by an A/D converter 181 through a CDS/AGC circuit 177, and similarly input, e.g., to the memory controller of FIG. 3.

The lower-right ¼ output read from the image pickup element 175 is converted into digital data by an A/D converter 182 through a CDS/AGC circuit 178, and then input to, e.g., the memory controller of FIG. 3.

Similarly, the lower-left ¼ output read from the image pickup element 175 is converted into digital data by an A/D converter 183 through a CDS/AGC circuit 179, and then input, e.g., to the memory controller of FIG. 3.

In the above first to sixth embodiments, the image pickup element 1 and the other unbalance amount calculation circuit, the system control CPU, and the like may be formed respectively on different semiconductor substrates, or on an identical semiconductor substrate by CMOS processing or the like.

The image pickup apparatus according to the above first to sixth embodiments brings the following effects.

The amount of unbalance of the plural outputs can be calculated from the image data itself output from the plural output terminals of the image pickup element simultaneously. Thus, the output unbalance changed due to an environmental change or the like after level adjustments of the plural outputs at the manufacturing stage can be automatically corrected, whereby non-continuity such as unevenness or the like appearing on the photographed picture can be apparently eliminated.

Further, the amount of unbalance among the plural outputs can be calculated from the part of the image data output from the plural output terminals of the image pickup element simultaneously. Thus, the output unbalance changed due to an environmental change or the like after level adjustments of the plural outputs at the manufacturing stage can be accurately and automatically corrected, whereby non-continuity such as unevenness or the like appearing on the photographed picture can be apparently eliminated.

Further, the present invention has a photographing mode which discriminates the amount of unbalance among the image data output from the plural output terminals of the image pickup element simultaneously. Thus, as long as the photographer must perform the photographing in the photographing mode beforehand, the amount of unbalance among the plural outputs can be easily discriminated, whereby non-continuity on the photographed image in the actual photographing can be eliminated based on the discriminated result.

Further, the present invention has a photographing mode which discriminates the amount of unbalance of the image data output from the plural output terminals of the image pickup element simultaneously. Thus, when the photographer performs the photographing in the photographing mode beforehand, it is possible to generate a warning to indicate to the photographer that the photographed scene is inappropriate, thereby enabling the photographer to perform photographing for appropriate calibration.

Further, after the image data simultaneously output from the plural output terminals of the image pickup element is first stored in the memory, the amount of unbalance among the plural outputs can be calculated using part of the memory data. Thus, the output unbalance changed due to an environmental change or the like after level adjustments of the plural outputs at the manufacturing stage can be accurately and automatically corrected by calculation of the CPU or the like while spending time to some extent, whereby non-continuity such as unevenness or the like appearing on the photographed picture can be apparently eliminated.

The present invention is applicable to a system composed of plural pieces of equipment (e.g., a host computer, interface equipment, a reader, a printer, etc.) or to an apparatus including a single piece of equipment (e.g., a copying machine, a facsimile machine or the like).

It is needless to say that the object of the present invention can be achieved in a case where a storage medium storing the program codes of software for realizing the functions of the above embodiments is supplied to a system or an apparatus and then a computer (or CPU or MPU) in the system or the apparatus reads and executes the program codes stored in the memory medium. In this case, the program codes themselves read from the storage medium realize the functions of the above embodiments, and the storage medium storing such program codes constitutes the present invention. Further, it is needless to say that the present invention also includes not only the case where the functions of the above embodiments are realized by executing the program codes read by the computer, but also a case where an operating system (OS) or the like functioning on the computer executes all or a part of the processing according to instructions of the program codes, thereby realizing the functions of the above embodiments.

Further, it is needless to say that the present invention further includes a case where the program codes read from the storage medium are first written in a memory provided in a function expansion card inserted in the computer or a function expansion unit connected to the computer, and then a CPU or the like provided in the function expansion card or the function expansion unit executes all or a part of the processing according to instructions of such program codes, thereby realizing the functions of the above embodiments.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
    an image pickup area which includes first and second areas each of which converts an object image into an electric signal, a first output terminal for outputting the electric signal from the first area, and a second output terminal for outputting the electric signal from the second area;
    a correction circuit which corrects at least one of the electric signal output from the first output terminal and the electric signal output from the second output terminal, on the basis of a correlative relationship between the electric signal output from a portion of the first area through the first output terminal and the electric signal output from a portion of the second area through the second output terminal; and a timing generation circuit which drives a plurality of pixels arranged in a predetermined direction across the boundary between the first and second areas so that a read-out order of signals from pixels included in the first area among the plurality of pixels and a read-out order of signals from pixels included in the second area among the plurality of pixels are in reverse order, wherein a side on a side opposite to the boundary side of the portion of the first area is on the boundary side with respect to the center of the first area, and a side on a side opposite to the boundary side of the portion of the second area is on the boundary side with respect to the center of the second area.

2. An image pickup apparatus according to claim 1, wherein said correction circuit discriminates high-correlation areas and low-correlation areas in the electric signals respectively output from the first and second output terminals, and calculates the correlation of the high-correlation areas in the electric signals.

3. An image pickup apparatus according to claim 1, further comprising an image synthesizing circuit for synthesizing the electric signals output from said first and second output terminals.

4. An image pickup apparatus according to claim 1, wherein said correction circuit performs calculation of the correlation using a result of averaging processing of the electric signals from predetermined areas of the respective first and second areas.

5. An image pickup apparatus according to claim 1, wherein said correction circuit performs calculation of the correlation using the electric signals from parts of the respective first and second areas.

6. An image pickup apparatus according to claim 1, further comprising a control circuit, having a first mode to execute calibration and a second mode to execute photographing, for causing said correction circuit to perform calculation of the correlation when said first mode is being selected, and for causing said correction circuit to perform the correction processing based on the calculated result in said first mode when said second mode is being selected.

7. An image pickup apparatus according to claim 6, wherein, in the first mode, said correction circuit notifies a photographer of the calculated result.

8. An image pickup apparatus according to claim 1, wherein said correction circuit performs at least one of gain adjustment and offset adjustment on the electric signals respectively output from said first and second output terminals.

9. An image pickup apparatus according to claim 2, wherein said correction circuit performs the discrimination using at least one of luminance, hue and frequency components of the electric signals respectively output from said first and second output terminals.

10. An image pickup apparatus according to claim 1, further comprising an analog-to-digital conversion circuit for converting the electric signals output from said first and second output terminals into digital signals, and wherein correlation calculation and correction processing by said correction circuit are performed on the digital signals converted by said analog-to-digital conversion circuit.

11. A control method for an image pickup apparatus which includes an image pickup area having first and second areas each of which converts an object image into an electric signal, a first output terminal for outputting an electric signal from the first area, and a second output terminal for outputting an electric signal from the second area, said method comprising:

a first step of correcting at least one of the electric signal output from the first output terminal and the electric signal output from the second output terminal, on the basis of the correlative relationship between the electric signal output from a portion of the first area through the first output terminal and the electric signal output from a portion of the second area through the second output terminal; and a second step of driving a plurality of pixels arranged in a predetermined direction across the boundary between the first and second areas so that a read-out order of signals from pixels included in the first area among the plurality included in the second area among the plurality of pixels are in reverse order, wherein a side on a side opposite to the boundary side of the portion of the first area is on the boundary side with respect to the center of the first area, and a side on a side opposite to the boundary side of the portion of the second area is on the boundary side with respect to the center of the second area.

12. A storage medium which stores a control program for controlling an image pickup apparatus including image pickup area which includes first and second areas each of which converts an object image into an electric signal, a first output terminal for outputting the electric signal from the first area, and a second output terminal for outputting the electric signal from the second area, said program comprising:

a first procedure of correcting at least one of the electric signal output from the first output terminal and the electric signal output from the second output terminal, on the basis of correlative relationship between the electric signal output from a portion of the first area through the first output terminal and the electric signal output from a portion of the second area through the second output terminal; and a second procedure of driving a plurality of pixels arranged in a predetermined direction across the boundary between the first and second areas so that a read-out order of signals from pixels included in the first area among the plurality of pixels and a read-out order of signals from pixels included in the second area among the plurality of pixels are in reverse order, wherein a side on a side opposite to the boundary side of the portion of the first area is on the boundary side with respect to the center of the first area, and a side on a side opposite to the boundary side of the portion of the second area is on the boundary side with respect to the center of the second area.

13. An image pickup apparatus comprising:

image pickup areas for picking up an image of an object by dividing the image into plural areas;

plural output portions, each provided for a respective one of said image pickup areas, for outputting an image signal from the respective one of said image pickup areas;

a calculation circuit for calculating correlation among the plural image signals respectively output from said plural output portions; and a correction circuit for performing correction processing on the plural image signals output from said plural output portions, on the basis of the signal from said calculation circuit, wherein said calculation circuit discriminates high-correlation areas and low-correlation areas in the plural image signals respectively output from said plural output portions, and calculates the correlation of the high-correlation areas in the plural image signals.

14. An image pickup apparatus comprising:

image pickup areas for picking up an image of an object by dividing the image into plural areas;

plural output portions, each provided for a respective one of said image pickup areas, for outputting an image signal from the respective one of said image pickup areas;

a calculation circuit for calculating correlation among the plural image signals respectively output from said plural output portions; and a correction circuit for performing correction processing on the plural image signals output from said plural output portions, on the basis of the signal from said calculation circuit, wherein said calculation circuit discriminates high-correlation areas and low-correlation areas in the plural image signals respectively output from said plural output portions, and calculates the correlation of the high-correlation areas in the plural image signals, and said calculation circuit performs the discrimination using at least one of luminance, hue and frequency components of the image signals respectively output from said plural output portions.

* * * * *